(12) United States Patent
Cases et al.

(10) Patent No.: US 7,444,490 B2
(45) Date of Patent: Oct. 28, 2008

(54) APPARATUS, SYSTEM, AND METHOD FOR MODIFYING MEMORY VOLTAGE AND PERFORMANCE BASED ON A MEASURE OF MEMORY DEVICE STRESS

(75) Inventors: Moises Cases, Austin, TX (US); Daniel N. de Araujo, Cedar Park, TX (US); Nam Huu Pham, Round Rock, TX (US); Menas Roumbakis, Venetia, PA (US)

(73) Assignee: International Business Machines Corporation, Armonk, NY (US)

( * ) Notice: Subject to any disclaimer, the term of this patent is extended or adjusted under 35 U.S.C. 154(b) by 281 days.

(21) Appl. No.: 11/148,912

(22) Filed: Jun. 9, 2005

(65) Prior Publication Data

US 2006/0280018 A1   Dec. 14, 2006

(51) Int. Cl.
| | |
|---|---|
| *G06F 12/00* | (2006.01) |
| *G06F 13/00* | (2006.01) |
| *G06F 13/28* | (2006.01) |
| *G06F 11/00* | (2006.01) |
| *G11C 29/00* | (2006.01) |
| *G11C 7/04* | (2006.01) |
| *G11C 11/34* | (2006.01) |
| *H01L 35/00* | (2006.01) |
| *H01L 37/00* | (2006.01) |
| *H03K 3/42* | (2006.01) |
| *H03K 17/78* | (2006.01) |

(52) U.S. Cl. .................. 711/167; 714/704; 714/721; 365/211; 365/212; 327/509; 327/512; 327/513

(58) Field of Classification Search .................. None
See application file for complete search history.

(56) References Cited

U.S. PATENT DOCUMENTS

| 4,812,733 | A | * | 3/1989 | Tobey ................... 323/285 |
|---|---|---|---|---|
| 5,910,924 | A | * | 6/1999 | Tanaka et al. ........... 365/226 |
| 6,134,167 | A | * | 10/2000 | Atkinson ............... 365/222 |
| 6,421,215 | B1 | | 7/2002 | Bushue ................. 361/93.1 |
| 6,560,725 | B1 | * | 5/2003 | Longwell et al. .......... 714/54 |

\* cited by examiner

*Primary Examiner*—Sanjiv Shah
*Assistant Examiner*—Marwan Ayash
(74) *Attorney, Agent, or Firm*—Kunzler & McKenzie

(57) ABSTRACT

An apparatus, system, and method are disclosed for modifying memory device timing and voltage. A detection module detects a change of memory device stress. A timing modification module modifies the memory device timing in response to the change of the memory device stress. In addition, a voltage modification module modifies the memory device voltage in response to the change of the memory device stress. In one embodiment, a processor pause module pauses the operation of a processor module while the timing modification module modifies the memory device timing and the voltage modification module modifies the memory device voltage.

3 Claims, 6 Drawing Sheets

APPARATUS, SYSTEM, AND METHOD FOR MODIFYING MEMORY VOLTAGE AND PERFORMANCE BASED ON A MEASURE OF MEMORY DEVICE STRESS

BACKGROUND OF THE INVENTION

1. Field of the Invention

This invention relates to modifying memory device voltage and more particularly relates to modifying memory device voltage and performance in response to changes in memory device stress.

2. Description of the Related Art

A data processing device ("DPD") such as a server, computer workstation, router, mainframe computer, and the like typically uses a memory device such as dynamic random access memory ("DRAM"), static random access memory ("SRAM"), and the like to store instructions and data. For example, a processor module of the DPD may read and execute instructions from the memory device and read and process data from the memory device.

The performance of the memory device directly affects the performance of the DPD. For example, a memory device with fast timing is able to deliver more instructions and data to the processor module during a specified time interval than a memory device with slow timing. As a result, the processor module may execute more instructions and process more data, increasing overall DPD performance.

The performance of the memory device is typically related to the voltage of the memory device. For example, the memory device may have faster timing with a voltage of three point three volts (3.3 V) than with a voltage of three volts (3 V). Thus increasing memory device voltage increases potential performance while decreasing the memory device voltage decreases potential performance.

Unfortunately, operating the memory device at a higher voltage may have one or more adverse consequences. For example, a higher memory device voltage increases the heat generated by the memory device. As a result, the DPD may require more expensive cooling devices to maintain the desired temperature for the DPD. Increasing the voltage and timing for the memory device may also increase the stress on elements of the memory device, increasing the risk of failure. For example, one or more semiconductor gates comprising the memory device may be significantly more likely to fail at a higher voltage and temperature than at a lower voltage and temperature. As a result, memory device voltages have typically been set at conservative levels to avoid high temperatures or the risk of device failure. Yet the benefits of higher voltage and performance are significant, making higher voltage performance attractive if the negative consequences may be mitigated.

From the foregoing discussion, it should be apparent that a need exists for an apparatus, system, and method that modify the voltage and performance of a memory device responsive to memory device stress. Beneficially, such an apparatus, system, and method would allow a DPD to take advantage of higher memory voltage while mitigating potentially negative consequences.

SUMMARY OF THE INVENTION

The present invention has been developed in response to the present state of the art, and in particular, in response to the problems and needs in the art that have not yet been fully solved by currently available memory device voltage solutions. Accordingly, the present invention has been developed to provide an apparatus, system, and method for modifying memory device voltage and performance that overcome many or all of the above-discussed shortcomings in the art.

The apparatus to modify memory device voltage and performance is provided with a logic unit containing a plurality of modules configured to functionally execute the necessary steps of detecting a change of memory device stress, modifying memory device timing, and modifying memory device voltage. These modules in the described embodiments include a detection module, a timing modification module, and a voltage modification module. In addition, the apparatus may include a sensor module and a processor pause module.

In one embodiment, the sensor module monitors memory device stress. The sensor module may monitor thermal stress. For example, the sensor module may monitor the ambient temperature inside a DPD enclosure containing the memory device. The sensor module may also monitor operational stress. For example, the sensor module may monitor a memory device data error rate.

The detection module detects a change of memory device stress. For example, if the sensor module monitored a low data error rate at a first time and a higher data error rate at a subsequent second time, the detection module may detect a change of memory device stress. In an alternate example, if the sensor module monitored a temperature that exceeded a specified temperature threshold, the detection module may also detect a change of memory device stress.

The timing modification module modifies memory device timing in response to the change of the memory device stress. For example, if the detection module detects increased memory device stress as indicated by an increase in memory device data error rate, the timing modification module may slow the timing of the memory device. In an alternate example, if the detection module detects decreased memory device stress as indicated by a decrease in temperature, the timing modification module may speed the timing of the memory device.

The voltage modification module modifies the memory device voltage in response to the change of the memory device stress. In one embodiment, if the detection module detects increased memory device stress, the voltage modification module may decrease the memory device voltage. In addition, if the detection module detects decreased memory device stress, the voltage modification module may increase the memory device voltage.

In one embodiment, the processor pause module pauses the operation of a processor module while the timing modification module modifies the memory device timing and the voltage modification module modifies the memory device voltage. For example, if the detection module detects decreased memory device stress, the processor pause module may pause the operation of the processor module. The timing modification module may subsequently speed the memory device timing and the voltage modification module may increase the memory device voltage. The processor pause module may then allow the processor module to resume operation. The apparatus modifies the memory device voltage and timing in response to changes in the memory device stress, supporting increased memory device performance while mitigating the adverse consequences of increased performance.

A system of the present invention is also presented to modify memory voltage and performance. The system may be embodied in a DPD such as a server. In particular, the system, in one embodiment, includes a processor module, a memory device, a voltage regulator module, a detection module, a timing modification module, and a voltage modification module.

The processor module executes instructions and processes data. The memory device stores the instructions and data. The voltage regulator module regulates the voltage of the memory device. For example, voltage regulator module may regulate the memory device voltage to two point five volts (2.5 V). Alternatively, the voltage regulator module may regulate the memory device voltage to one volt (1 V).

The detection module detects a change of memory device stress. The timing modification module modifies memory device timing in response to the change of the memory device stress. The voltage modification module modifies memory device voltage in response to the change of the memory device stress by directing the voltage regulator module to change the memory device voltage. In one embodiment, the system further includes a notification module. The notification module may notify an operator that the memory device requires replacement in response to an increase in the memory device stress. The system modifies memory device timing and voltage to mitigate increases in memory device stress and support increased memory device performance.

A method of the present invention is also presented for modifying memory voltage and performance. The method in the disclosed embodiments substantially includes the steps necessary to carry out the functions presented above with respect to the operation of the described apparatus and system. In one embodiment, the method includes detecting a change of memory device stress, modifying memory device timing, and modifying memory device voltage. The method also may include monitoring the memory device stress and pausing the operation of a processor module.

In one embodiment, a sensor module monitors memory device stress. A detection module detects a change of the memory device stress. A timing modification module modifies memory device timing in response to the change of the memory device stress. In addition, a voltage modification module modifies memory device voltage in response to the change of the memory device stress. In one embodiment, a processor pause module pauses the operation of a processor module while the timing modification module modifies the memory device timing and the voltage modification module modifies the memory device voltage.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

The present invention modifies the timing and the voltage of a memory device in response to a change in memory device stress. In addition, the present invention supports increased memory device performance while mitigating the adverse consequences of increased performance. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 1:
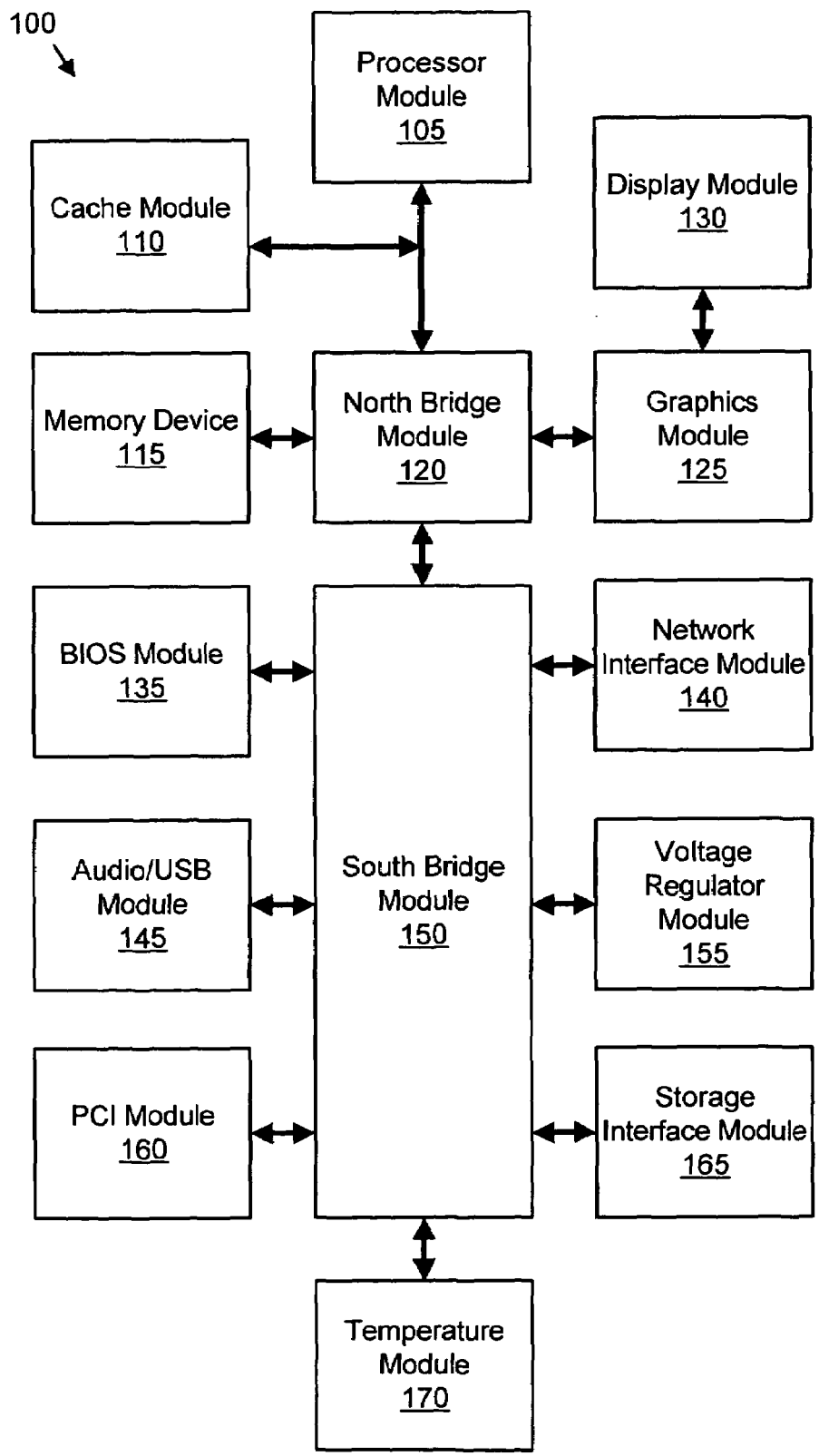
FIG. 1 is a schematic block diagram illustrating one embodiment of a DPD system in accordance with the present invention.

FIG. 1 is a schematic block diagram illustrating one embodiment of a DPD system 100 in accordance with the present invention. The system 100 includes a processor module 105, a cache module 110, a memory device 115, a north bridge module 120, a graphics module 125, a display module 130, a basic input/output system ("BIOS") module 135, a network interface module 140, an audio/universal serial bus ("USB") module 145, a south bridge module 150, a voltage regulator module 155, a peripheral component interconnect ("PCI") module 160, and a storage interface module 165.

The processor module 105, cache module 110, memory device 115, north bridge module 120, graphics module 125, BIOS module 135, network interface module 140, audio/USB module 145, south bridge module 150, voltage regulator module 155, PCI module 160, and storage interface module 165 may be fabricated of semiconductor gates on one or more semiconductor substrates. Each semiconductor substrate may be packaged in one or more semiconductor devices mounted on circuit cards. Connections between processor module 105, cache module 110, memory device 115, north bridge module 120, graphics module 125, BIOS module 135, network interface module 140, audio/USB module 145, south bridge module 150, voltage regulator module 155, PCI module 160, and storage interface module 165 may be through semiconductor metal layers, substrate to substrate wiring, or circuit card traces or wires connecting the semiconductor devices. In one embodiment, the memory device 115 is mounted on a circuit card and connected to the system 100 through a connector.

The memory device 115 stores instructions and data. The memory device 115 may be any type of RAM memory, including DRAM, SRAM, Flash RAM, and the like. The processor module 105 executes the instructions and manipulates the data as is well know to those skilled in the art. The processor module 105 communicates with the memory device 115 through the north bridge module 120. The north bridge module 120 may control the timing of a memory access to the memory device 115. For example, the north bridge module 120 may read data from the memory device 115 ninety nanoseconds (90 ns) after asserting valid address and read signals to the memory device 115. In an alternate example, the north bridge module 120 may read data from the memory device 115 seventy nanoseconds (70 ns) after asserting the valid address and read signals to the memory device 115.

The processor module 105 communicates with the BIOS module 135, network interface module 140, audio/USB module 145, voltage regulator module 155, PCI module 160, and storage interface module 165 through the north bridge module 120 and the south bridge module 150. In one embodiment, the north bridge module 120 is configured to transfer data at higher speeds and the south bridge module 150 is configured to transfer data at slower speeds.

In one embodiment, the memory device 115 may calculate and store an error correction code with each instruction and data value. The north bridge module 120 may use the error correction code to determine if instructions and data read from the memory device 115 are valid. For example, the north bridge module 120 may calculate an error correction code for a data value and compare the error correction code with an error correction code stored with the data value. If the error correction codes are equivalent, the north bridge module 120 treats the data value as valid, but if the error correction codes are not equivalent, the north bridge module 120 may identify a data error.

The voltage regulator module 155 regulates the voltage of the memory device. In one embodiment, the voltage regulator module 155 is programmable. In addition, the voltage regulator module 155 may supply the memory device 115 with power through one or more power lines separate and distinct from the power lines supplying other components. For example, the voltage regulator module may supply the processor module 105 with three point three volt (3.3 V) power while regulating the memory device with power in the range between three point six volts (3.6 V) and three volts (3 V).

In one embodiment, the system 100 further comprises a temperature module 170. In the depicted embodiment, the temperature module 170 is in communication with the south bridge 150, although the temperature module 170 may also communicate with other modules. The temperature module 170 may be configured as a thermocouple, and measure the ambient temperature of the memory device 115.

Figure 2:
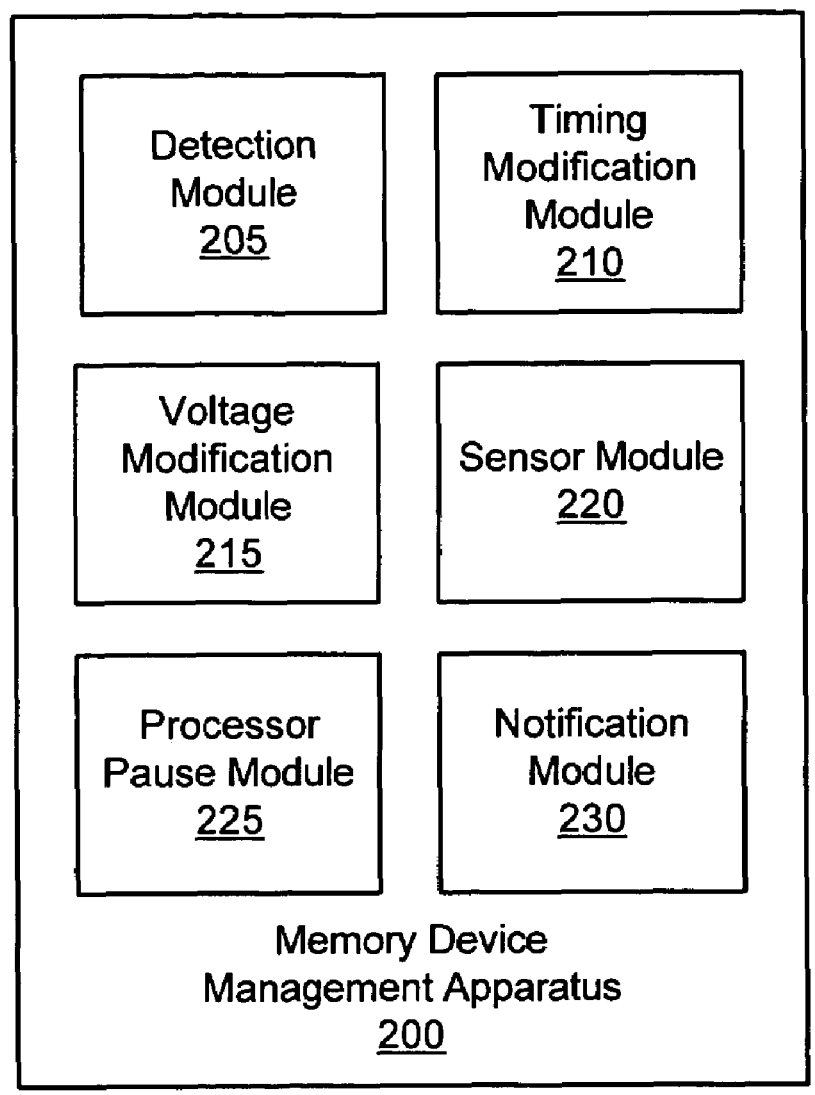
FIG. 2 is a schematic block diagram illustrating one embodiment of a memory device management apparatus of the present invention.

FIG. 2 is a schematic block diagram illustrating one embodiment of a memory device management apparatus 200 of the present invention. The apparatus 200 may be incorporated within the system 100 of FIG. 1 in a manner that will be described hereafter. The apparatus 200 includes a detection module 205, a timing modification module 210, a voltage modification module 215, a sensor module 220, a processor pause module 225, and a notification module 230.

In one embodiment, the sensor module 220 monitors memory device stress. The sensor module 220 may monitor thermal stress. For example, the sensor module 220 may be the temperature module 170 of FIG. 1. The sensor module 200 may monitor the ambient temperature inside the DPD system 100 enclosure containing the memory device 115. The sensor module 220 may also be mounted on the memory device 115 such as on circuit card mounting the memory device 115.

The sensor module 220 may also monitor operational stress. In one embodiment, the north bridge module 120 of FIG. 1 may comprise the sensor module 220. For example, the sensor module 220 may monitor the memory device 115 data error rate by identifying data errors in data values read from the memory device 115.

The detection module 205 detects a change of memory device stress. In one embodiment, the detection module 205 detects a change of memory device operational stress. For example, if the sensor module 220 monitors a low data error rate such as no single bit data errors during a first time interval and a higher data error rate such as one single bit data error during a subsequent second time interval, the detection module 205 may determine that a change of memory device stress has occurred. In an alternate example, if the sensor module 220 monitors a high data error rate such as two (2) or more single bit data errors during a first time interval and a lower data error rate such as one (1) single bit data error during a subsequent second time interval, the detection module 205 may also determine that a change of memory device stress has occurred. The north bridge module 120 of FIG. 1 may comprise the detection module 205.

In an alternate embodiment, the detection module 205 detects a change of memory device thermal stress. For example, if the sensor module 220 monitors a temperature that exceeds a first specified temperature threshold such as eighty-five degrees Celsius (85° C.), the detection module 205 may detect a change of memory device stress. If addition, if the sensor module 220 monitors a temperature that is less than a second specified temperature threshold such as seventy-five degrees Celsius (75° C.), the detection module 205 may also determine that a change of memory device stress has occurred.

The timing modification module 210 modifies memory device timing in response to the change of the memory device stress. In one embodiment, the north bridge module 120 of FIG. 1 comprises the timing modification module 210. If the detection module 205 detects increased memory device stress as indicated by an increase in the memory device data error rate, the timing modification module 210 may slow the timing of the memory device 115. For example, if the memory device data error rate increases from zero (0) to one (1) error per time interval, the timing modification module 210 may slow the timing for reading data from the memory device 115 to ninety nanoseconds (90 ns) after asserting valid address and read signals to the memory device 115 from seventy nanoseconds (70 ns) after asserting the valid address and read signals. In an alternate embodiment, the timing modification module 210 may speed the memory device timing if the memory device data error rate decreases from one (1) to zero (0) errors per time interval.

In an alternate example, if the detection module 205 detects decreased memory device stress as indicated by an ambient temperature below a second specified temperature such as seventy-five degrees Celsius (75° C.), the timing modification module 210 may speed the memory device timing. For example, the timing modification module 210 may speed the timing for reading data from the memory device 115 from ninety nanoseconds (90 ns) after asserting valid address and read signals to the memory device 115 to seventy nanoseconds (70 ns).

The voltage modification module 215 also preferably modifies memory device voltage in response to the change of the memory device stress. In one embodiment, the voltage modification module 215 may comprise the north bridge module 120 and the voltage regulator module 155 of FIG. 1.

In one embodiment, if the detection module 205 detects increased memory device stress, the voltage modification module 215 may decrease the memory device voltage. For example, the voltage modification module 215 may direct the voltage regulator module 155 to decrease the memory device voltage from three point three volts (3.3 V) to three volts (3 V). In an alternate example, if the detection module 205 detects decreased memory device stress, the north bridge module 120 may direct the voltage regulator module 155 to increase the memory device voltage from three point three volts (3.3 V) to three point six volts (3.6 V).

In one embodiment, the processor pause module 225 pauses the operation of a processor module 105 such as the processor module 105 of FIG. 1 while the timing modification module 210 modifies the memory device timing and the voltage modification module 215 modifies the memory device voltage. For example, if the detection module 205 detects a decrease of memory device stress, the processor pause module 225 may pause the operation of the processor module 105. The timing modification module 210 may subsequently speed the memory device timing and the voltage modification module 215 may increase the memory device voltage. The processor pause module 225 may then allow the processor module 105 to resume operation.

In one embodiment, the notification module 230 notifies an operator that the memory device 115 requires replacement in response to the change in the memory device stress. For example, if the memory device data error rate increases, the notification module 230 may notify the operator such as through the display module 130 of FIG. 1 that the memory device 115 requires replacement. Because the apparatus 200 has modified the memory device timing and voltage to reduce memory device stress, the memory device 115 is less likely to fail prior to replacement. The apparatus 200 modifies memory device voltage and timing in response to changes in memory device stress, supporting increased memory device performance while mitigating the adverse consequences of increased performance.

Figure 3:
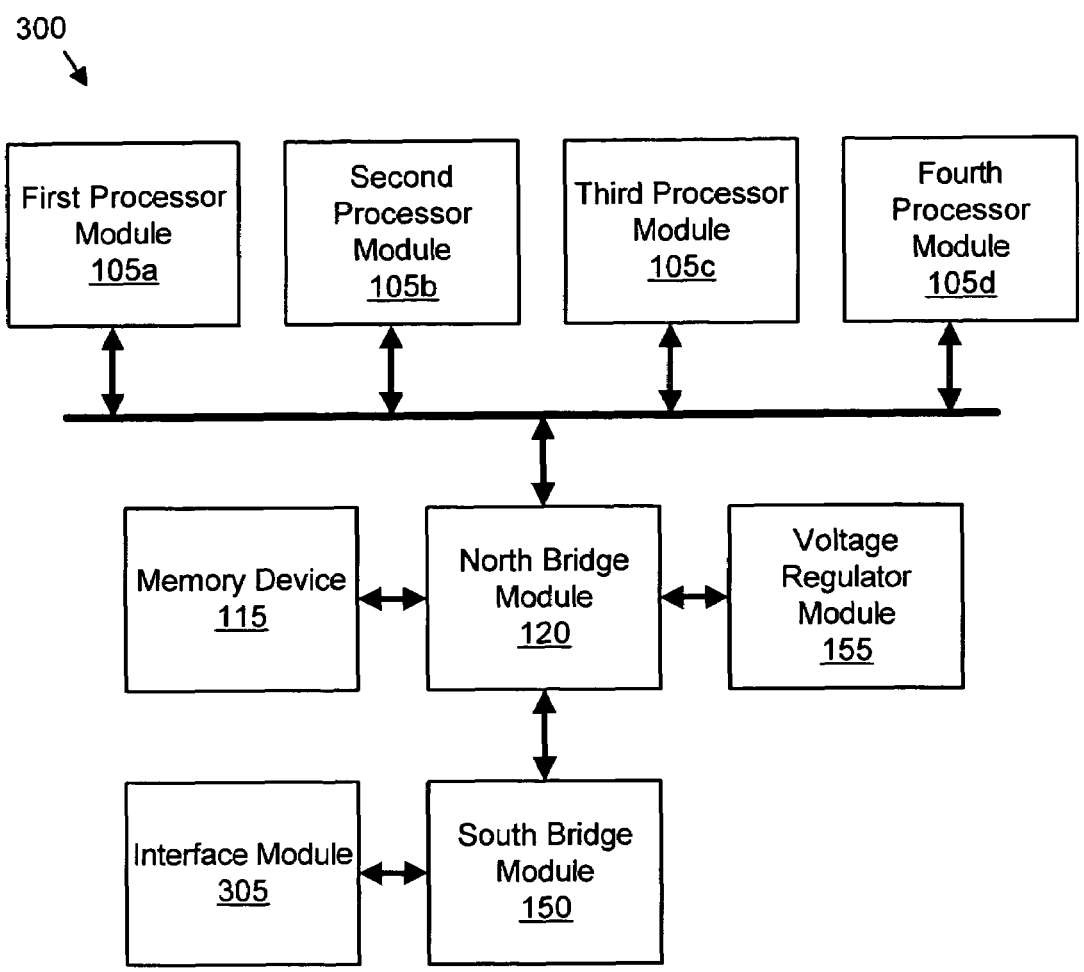
FIG. 3 is a schematic block diagram illustrating one embodiment of a symmetric multiprocessor system of the present invention.

FIG. 3 is a schematic block diagram illustrating one embodiment of a symmetric multiprocessor system 300 of the present invention. The system 300 comprises the apparatus 200 of FIG. 2. As depicted, the system 300 includes one or more processor modules 105, a north bridge module 120, a memory device 115, a voltage regulator module 155, a south bridge module 150, and an interface module 305. Although for simplicity the system 300 is depicted with four processor modules 105 and one memory device 115, any number of processor modules 105 and memory devices 115 may be employed. In one embodiment, the system 300 is an xSeries 445 e-server manufactured by International Business Machines Corporation of Armonk, N.Y.

Each of the processor modules 105 communicates with the memory device 115 through the north bridge module 120. The north bridge module 120 may comprise the sensor module 220, the detection module 205, and the timing modification module 210 of FIG. 2. In addition, the north bridge module 120 and the voltage regulator module 155 may comprise the voltage modification module 215 of FIG. 2. For example, the north bridge module 120 may monitor the memory device data error rate. If the north bridge module 120 detects a change of memory device stress, the north bridge module 120 may modify the timing of communications with the memory device 115. In addition, the north bridge module 120 may direct the voltage regulator module 155 to modify the memory device voltage.

The interface module 305 may communicate with one or more external devices such as an operator workstation. In one embodiment, the north bridge 120 and a software process executing on one or more processor modules 105 may further comprise the notification module 230 of FIG. 2. In response to a change in the memory device stress such as the memory device data error rate detected by the north bridge module 120, the software process executing on a first processor module 105a may notify an operator to replace the memory device 115 by communicating a message through the interface module 305. The system 300 modifies memory device voltage and timing in response to changes in memory device stress in a symmetric multiprocessing environment.

Figure 4:
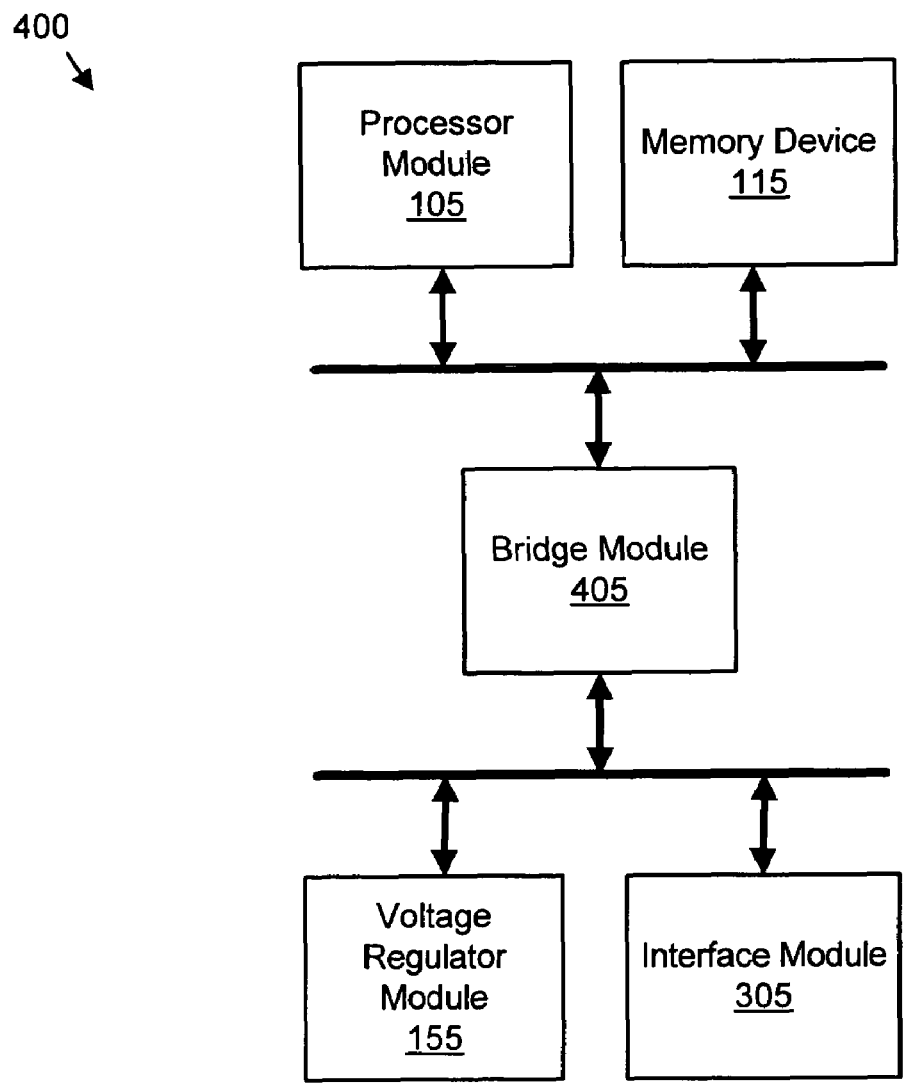
FIG. 4 is a schematic block diagram illustrating one embodiment of an alternate DPD system of the present invention.

FIG. 4 is a schematic block diagram illustrating one embodiment of an alternate DPD system 400 of the present invention. The system 400 incorporates the various components of the apparatus 200 of FIG. 2. As depicted, the system 400 includes a processor module 105, a memory device 115, a bridge module 405, a voltage regulator module 155, and an interface module 305. The system 400 may be embodied in an embedded controller or the like.

As depicted, the processor module 105 communicates directly with the memory module 115. The processor module 105 also communicates through the bridge module 405 with the voltage regulator 155 and the interface module 305. In addition, the processor module 105 may communicate with external devices through the interface module 305. In one embodiment, the processor module 105 comprises the sensor module 220, the detection module 205, and the timing modification module 210 of FIG. 2. In addition, the processor module 105 and the voltage regulator module 155 may comprise the voltage modification module 215 of FIG. 2.

The processor module 105 may execute a software process that monitors the data error rate of the memory device 115. If the software process detects a change in the memory device data error rate, the software process directs the processor module 105 to modify the timing of communications with the memory device 115. In addition, the processor module 105 executing the software process directs the voltage regulator module 155 to modify the memory device voltage. The system 400 modifies memory device timing and voltage in response to changes in memory device stress in systems such as an embedded system.

Figure 5:
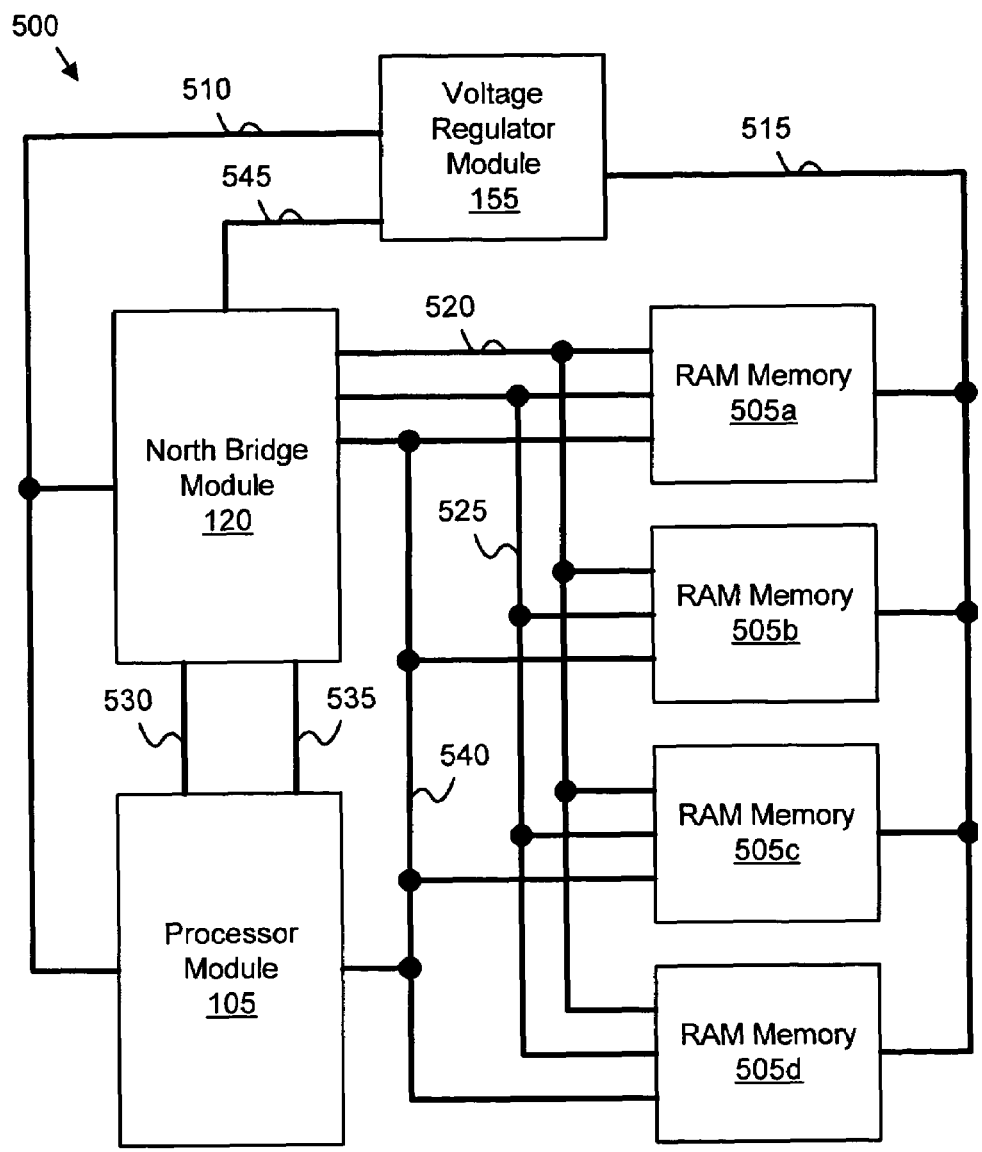
FIG. 5 is a schematic block diagram illustrating one embodiment of a timing and voltage management system of the present invention.

FIG. 5 is a schematic block diagram illustrating one embodiment of a timing and voltage management system 500 of the present invention. The system 500 illustrates one manner of operation of the apparatus 200 of FIG. 2. A voltage regulator module 155 such as the voltage regulator module 155 of FIGS. 1, 3, and 4 may be used to supply power at one or more regulated voltages. In one embodiment, the voltage regulator module 155 supplies power 515 at a first voltage to one or more RAM memories 505. The RAM memories may be DRAM, SRAM, and the like and comprise the memory device 115 of FIGS. 1, 3, and 4. Although the system 500 is depicted with four RAM memories 505, any number of RAM memories 505 may be employed.

In one embodiment, the first voltage power 515 may vary from five volts (5 V) to one volt (1 V). In a certain embodiment, the first voltage power 515 may vary from three point six volts (3.5 V) to three volts (3 V). In addition, the voltage regulator module 155 may supply power 510 at a second voltage to the north bridge module 120 and the processor module 105. In a certain embodiment, the second voltage power 510 is three point three volts (3.3 V). The north bridge module 120 and the processor module 105 may be the north bridge module 120 and processor module 105 of FIG. 1 and 3.

The north bridge module 120 reads data from and writes data to the RAM memories 505 using a first address bus 520 and a first data bus 525 as is well known to those skilled in the art. The north bridge module 120 may further communicate the data to and from the processor module 105 using a second address bus 530 and a second data bus 535.

In the depicted embodiment, the north bridge module 120 provides a clock signal 540 for the RAM memories 505 and the processor module 105. In one embodiment, the north bridge module 120 comprising the timing modification module 210 of FIG. 2 may modify the RAM memory timing by modifying the clock signal 540. In one embodiment, the north bridge module 120 comprising the voltage modification module 215 may also modify the RAM memory voltage by directing the voltage regulator module 155 to change the first voltage power 515 voltage.

The schematic flow chart diagram that follows is generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
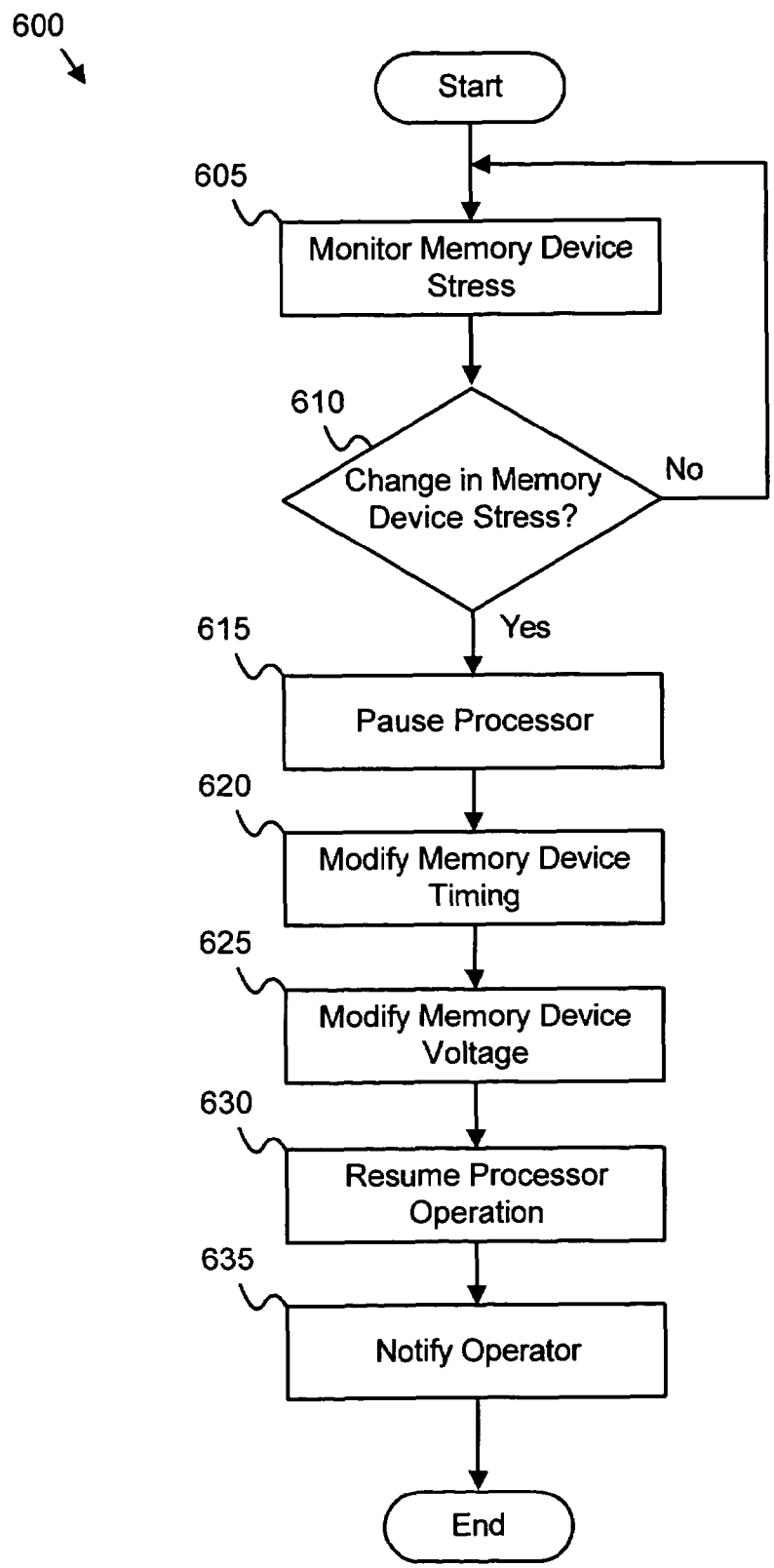
FIG. 6 is a schematic flow chart diagram illustrating one embodiment of a timing and voltage modification method of the present invention.

FIG. 6 is a schematic flow chart diagram illustrating one embodiment of a timing and voltage modification method 600 of the present invention. The method 600 substantially includes the steps necessary to carry out certain embodiments of the functions presented above with respect to the operation of the described systems 100, 300, 400 in FIGS. 1, 3, and 4 and apparatus 200 in FIG. 2.

In one embodiment, the method 600 begins and a sensor module 220 monitors 605 memory device stress. In a certain embodiment, the sensor module 220 is the temperature module 170 of FIG. 1 and monitors 605 thermal stress such as the package temperature of RAM memory 505 that may comprise a memory device 115. In an alternate embodiment, the sensor module 220 is embodied in a chipset such as the north bridge module 120 of FIGS. 1, 3, and 5 and monitors the data error rate of the memory device 115.

A detection module 205 detects 610 a change of memory device stress. The change of memory device stress may be an increase in stress. For example, the detection module 205 may detect 610 an increase in stress if the memory device data error rate for a second time interval is over fifty percent (50%) greater than the memory device data error rate for a previous first time interval. In an alternate embodiment, the detection module 205 may detect 610 an increase in stress if the ambient temperature for the memory device exceeds a specified temperature threshold such as seventy degrees Celsius (70° C.).

The change of the memory device stress may also be a decrease in stress. For example, the detection module 205 may detect 610 a decrease in stress if the memory device data error rate for the second time interval is over fifty percent (50%) less than the memory device data error rate for the previous first time interval. In an alternate embodiment, the detection module 205 may detect 610 a decrease in stress if the ambient temperature for the memory device falls below a specified temperature threshold such as forty-five degrees Celsius (45° C.).

If the detection module 205 does not detect 610 the change of the memory device stress, the sensor module 220 may continue to monitor 605 memory device stress. In one embodiment, if the detection module 205 detects 610 the change of the memory device stress, a processor pause module 225 pauses 615 the processor module 105. For example, the north bridge module 120 may comprise the processor pause module 225 and may assert a suspend signal to pause the processor module 105. In an alternate embodiment, the processor module 105 is not paused.

A timing modification module 210 modifies 620 memory device timing in response to the change of the memory device stress. The north bridge module 120 may comprise the timing modification module 210 and may adjust a clock 540 such as the clock 540 of FIG. 5 to modify the timing. For example, if the detection module 205 detected 610 an increase in memory device stress, the timing modification module 210 may modify 620 the clock 540 for the memory module 115 from one hundred and eleven megahertz (111 MHz) to eighty-three megahertz (83 MHz). In an alternate example, if the detection module 205 detected 610 a decrease in memory device stress, the timing modification module 210 may modify 620 the clock 540 for the memory module 115 from eighty-three megahertz (83 MHz) to one hundred and thirty-three megahertz (133 MHz).

A voltage modification module 215 modifies 625 memory device voltage in response to the change of the memory device stress. For example, the voltage modification module 215 may modify the memory device voltage from three point three volts (3.3 V) to two point five volts (2.5 V) if the detection module 205 detects 610 an increase in memory device stress. In an alternate example, the voltage modification module 215 may modify the memory device voltage from three volts (3 V) to three point three volts (3.3 V) if the detection module 205 detects 610 a decrease in memory device stress. The voltage modification module 215 may be comprised in the north bridge module 120 and a voltage regulator module 155 wherein the north bridge module 120 directs the voltage regulator module 155 to modify the memory device voltage.

In one embodiment, the processor pause module 225 resumes 630 the operation of the processor module 105. The memory device 115 timing and voltage is modified to support a level of memory device performance with an appropriate level of memory device stress. In one embodiment, a notification module 230 notifies 635 an operator that the memory device 115 requires replacement. In an alternate embodiment, the notification module 230 notifies an operator and directs the ordering of a replacement memory device 115. For example, if the detection module 205 detects 610 increased memory device stress as indicated by an increased memory device data error rate, the notification module 225 may notify the operator that a replacement is required. The method 600 further adjusts the memory device 115 timing and voltage to reduce the likelihood that the memory device 115 will fail before replacement.

The present invention is the first to modify the timing and voltage of a memory device 115 in response to memory device stress. Modifying the timing and voltage allows the present invention to optimize memory device performance at acceptable levels of memory device stress. Thus stressed memory devices 115 may be kept operational at slower timing and reduced voltages while unstressed memory devices 115 are allowed to function at faster timing and increased voltages.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for deploying computer infrastructure, comprising integrating computer-readable code into a computing system, wherein the code in combination with the computing system is capable of performing the following:

monitoring memory device stress by continuously detecting both a change in a data error rate of a memory device and a change in temperature of the memory device, wherein an increase in memory device stress comprises one or more of an increase in the data error rate and an increase in temperature of the memory device:

detecting a change of the memory device stress;

modifying data read timing of the memory device responsive to the change of the memory device stress, wherein modifying data read timing of the memory device comprises changing a time for reading data from the memory device after asserting a valid address and a read signal;

modifying memory device voltage responsive to the change to the memory device stress; and pausing operation of a processor module while modifying the data read timing of the memory device and voltage of the memory device, and resuming normal operation of the processor module in response to completing modifying the memory device timing and modifying the memory device voltage, the processor module comprising at least a central processing unit ("CPU").

2. The method of claim 1, further comprising decreasing the memory device voltage and slowing the memory device timing responsive to an increase in the memory device stress.

3. The method of claim 1, further comprising increasing the memory device voltage and speeding the memory device timing responsive to a decrease in the memory device stress.

* * * * *